Jan. 14, 1958  J. G. JACKSON  2,819,555
FISH LINE SINKER
Filed June 13, 1956

INVENTOR
James Gordon Jackson

2,819,555
FISH LINE SINKER

James Gordon Jackson, Port Alberni,
British Columbia, Canada

Application June 13, 1956, Serial No. 591,138

3 Claims. (Cl. 43—44.95)

This invention relates to improvements in slip sinkers for troll fishing.

In the art of troll fishing a weight commonly called a sinker is required to keep the lure under the surface of the water. It is desirable to have a sinker that can be attached onto the fishing line without removing the lure, preferably by an eye located in the front end of the sinker so designed that the line can slide through the eye but will not shake off when the fish is fighting.

Further, it is desirable that the sinker be provided with a locking device to keep it set at the proper location on the line while trolling. This location varies from a few feet to many yards ahead of the lure. This locking device is adjustable to suit the type of line or lure in use. The tension of the locking device should be sufficient to keep the sinker from slipping on the line, yet it should release easily when a fish pulls on the lure, thereby allowing the sinker to hang free by the eye and slide down the line as far as the leader, so as to allow the fisherman to reel in all of the line.

The object of this invention is to provide a sinker that embodys an adjustable tension device that can be readily set to suit the type of line and lure in use.

A further object of the invention is to provide a sinker with tension pads that grip the line over sufficient length to prevent cutting or fraying of the line.

A still further object of the invention is to provide a sinker that employs two sections of its body for the tension device, the line being held between the two sections which in turn are held together by a screw and spring to provide the adjustable tension.

A further object of the invention is to provide a sinker with a tension device that can be set on the line by simply pulling the line into a slot which allows the line to enter between the two sections of the body.

Another object of the invention is to provide a sinker which can be attached to the line by means of an eye without removing the lure.

A still further object of the invention is to provide a sinker employing an eye which cannot shake off the line when the fish is fighting.

With the above and other objects in view, the present invention consists essentially of a body with an eye in the front end through which a fishing line is threaded. The body consisting of two sections, the smaller of which is called a tension block is set into a recess in the larger section or main body and the two sections held together by a screw and spring. The adjoining surfaces of the two sections to provide the tension grip to lock the sinker on the line with the amount of tension being adjustable by means of the screw and spring.

In the accompanying drawings—

Figure 1:
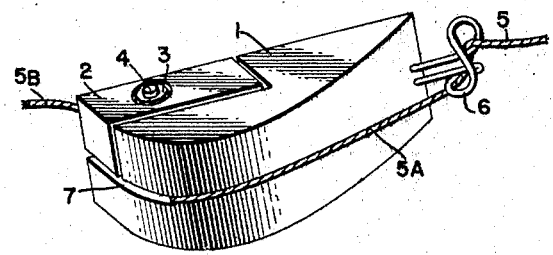
Figure 1 is a right side and lower perspective view of the sinker body.

With more particular reference to the indicated parts: A suitably shaped body 1 has embedded in the front end thereof an eye 6. As a structural reference, eye 6 has hooked ends embedded in the body 1, as illustrated in the cut away view in Figure 2.

A tension block 2 is set into a recess in the rear upper section of body 1, and is retained by nut 3, on the end of screw 4. Nut 3 rests in hole 13, in the outer side of block 2. Screw 4 extends through small hole 10, in block 2, and also through hole 14 in body 1, then through a washer 15, which rests on the bottom of hole 16 in body 1. Screw 4 further extends through coil spring 17 and terminates at its head 18.

The coil spring 17 being compressed by means of the screw head 18 and washer 15 exerts a tension between surfaces 8 and 9 and also 12 and 9A of the block 2 and body 1, 8 and 9 are the surfaces which grip the line, with the amount of tension being adjustable by the setting of the screw 4 in nut 3.

The slight recess 11, in the inner surface of block 2, allows for slight wear on tension surfaces 8 and 9.

When a fishing line is inserted between tension surfaces 8 and 9 the two surfaces will separate to accommodate the line but the end of surface 12 will remain in contact with surface 9A thus providing a lever action between the block and the body.

Figure 4:
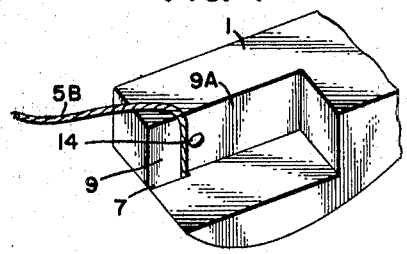
Figure 4 is a rear sectional view with the tension block removed.
Figure 5:
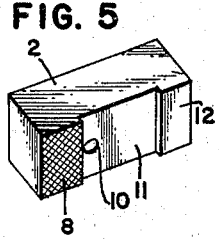
Figure 5 is an inverted view of the tension block removed from the body.
Figure 6:
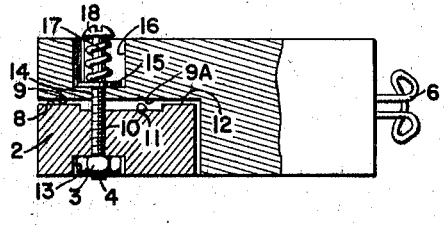
Figure 6 is a cut away view of the sinker body at the screw level.

A slot 7 in the lower rear section of body 1 provides a path for the fishing line to enter between the tension surfaces 8 and 9 as in Figure 1 and 4. The corners of surfaces 8 and 9 are rounded to allow the line to be easily inserted in the tension grip. The surfaces 8 and 9 can be smooth or if so desired, can be knurled to provide extra grip on the line.

Figure 2:
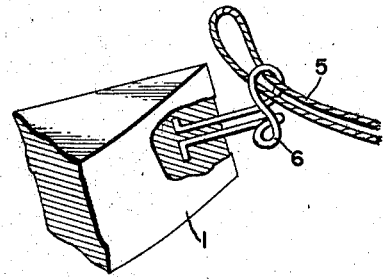
Figure 2 is a detailed cut away view of the front end of the sinker body.
Figure 3:
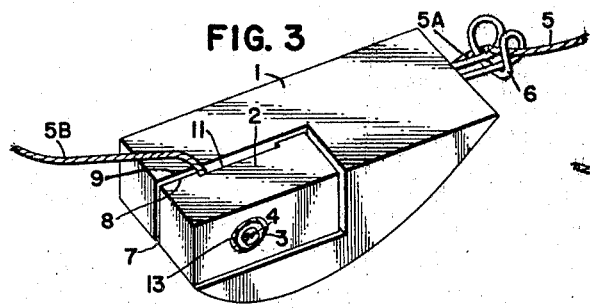
Figure 3 is a top and right side perspective view of the sinker.

To attach the sinker to the fishing line, the line 5, from rod, not shown, is doubled to form a small loop as illustrated in Figure 2. This small loop is inserted through one side of the eye and extended to form a large loop sufficient to extend over the body of the sinker. After the sinker is passed through the loop the line is pulled up and it will then be through both sides of the eye as in Figures 1, 3 and 7.

To remove the sinker from the line the above process is reversed.

The double eye prevents the sinker from shaking off the line when a fish is fighting.

The section of the line extending toward the lure is then brought along the underside of the body 1 as 5A and into slot 7, then with a light pull is inserted between the tension surfaces 8 and 9, from there emerging as 5B back toward the lure.

Figure 7:
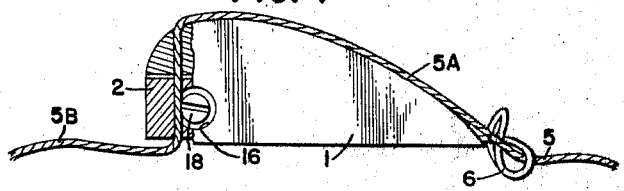
Figure 7 is an inverted left side view of the sinker body.

Figure 7, being an inverted view, shows the complete path of the fishing line through the entire sinker unit. The line 5 extends through the eye 6, then along the underside of body 1 as 5A, then into slot 7 and tension grip 8 and 9 and emerging as 5B back toward the lure. Tension adjustment is made by means of screw head 18 which turns screw 4 in nut 3.

The weight of the sinker hanging on the line tends to pull the line lengthwise through the tension grip and a light tension will hold it securely. The lure pulls on the line at nearly right angles to its path through the tension grip and therefore a light tug by a fish will pull the line free and allow the sinker to hang by its eye 6 and thus slide down the line toward the lure.

It is understood that slight modifications can be made in the design of various parts of this sinker unit, but such would not depart from the scope of this invention.

What I claim as my invention is:

1. A slip sinker unit for troll fishing comprising, a body with an eye attached to the front end thereof, a tension block set into a recess in the upper rear side section of said body, said tension block retained in position by a screw extending through a hole in said body and also through a hole in the said tension block and threading into a nut set into the outer side of the said tension block, a coil spring mounted on the said screw exerting a pressure between the head of said screw and the said body to provide a tension grip between said tension block and said body, said tension being adjustable by means of said screw threading into said nut to increase or decrease the compression of the said coil spring, said block being provided with a slot leading from said recess through the underside of said body, the sinker unit being attachable onto a fishing line by threading the said line through the said eye and extending along the underside of the said body thence upward into a slot which provides a path for the said line leading to the said tension grip, said line then passing between the said tension block and the said body thence back at nearly right angles toward the rear of said sinker unit, said tension grip preventing the sinker from slipping on said line, said line being adapted to pull free from said tension grip when a fish exerts a light tug on said line, the sinker then sliding freely on said line by means of said eye.

2. A slip sinker unit for troll fishing comprising essentially of a body, an eye mounted in the front end of said body, through which a fishing line is threaded and is able to slide when desired, a tension device consisting of a block set into a recess in the side of the upper rear section of said body, means comprising a screw and spring to retain said tension block in place, there being a slot in the lower rear section of said body extending to said recess to provide a path for said fishing line to enter between said tension device and said body, said tension device gripping the said line and holding the sinker at a predetermined location on the said fishing line until a fish pulls said line from said tension device thus permitting the sinker to slide on said line by means of said eye.

3. A sinker as claimed in claim 1, with at least one of the portions of the block and the tension device engaging said line being knurled.

References Cited in the file of this patent

UNITED STATES PATENTS

| | | |
|---|---|---|
| 1,259,664 | Peters | Mar. 19, 1918 |
| 2,495,572 | Deutsch | Jan. 24, 1950 |
| 2,539,162 | Redding | Jan. 23, 1951 |